(12) United States Patent
Vannan, Jr.

(10) Patent No.: US 6,354,349 B1
(45) Date of Patent: Mar. 12, 2002

(54) SEAMLESS REINFORCEMENT FOR RUBBER COMPOSITION AND PRODUCTS INCORPORATING SUCH MATERIAL

(75) Inventor: Frederick Forbes Vannan, Jr., Clinton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/445,885

(22) PCT Filed: Jun. 20, 1997

(86) PCT No.: PCT/US97/10620

§ 371 Date: Dec. 14, 1999

§ 102(e) Date: Dec. 14, 1999

(87) PCT Pub. No.: WO98/58794

PCT Pub. Date: Dec. 30, 1998

(51) Int. Cl.⁷ .............................. B60C 9/10; B29D 30/30
(52) U.S. Cl. ................ 152/526; 152/548; 152/563; 156/126; 156/130; 156/133
(58) Field of Search ................. 156/117, 126, 156/133, 134, 130.7, 130, 167, 244.15, 500; 152/526, 548, 563; 264/103, 209.2, 167, DIG. 81; 425/404, 382 N

(56) References Cited

U.S. PATENT DOCUMENTS

| | | | |
|---|---|---|---|
| 2,919,467 A | * 1/1960 | Mercer | 156/167 |
| 3,183,135 A | 5/1965 | Berquist | 156/126 |
| 3,222,440 A | 12/1965 | Murphy | 264/167 |
| 3,506,514 A | 4/1970 | D'Avello et al. | 156/132 |
| 3,568,749 A | * 3/1971 | Menell et al. | 152/562 |
| 3,895,992 A | 7/1975 | Azuma | 156/500 |
| 4,830,781 A | * 5/1989 | Oswald | 156/548 |

FOREIGN PATENT DOCUMENTS

| | | |
|---|---|---|
| EP | 0006057 | 5/1979 |
| EP | 0010873 | 10/1979 |
| EP | 0038280 A2 | 3/1981 |
| EP | 0254996 A2 | 7/1987 |
| FR | 1585927 | 6/1968 |
| GB | 2048971 | 2/1980 |

OTHER PUBLICATIONS

Patent Abstracts of Japan, Publication No. 05139116.

* cited by examiner

Primary Examiner—Geoffrey L. Knable
(74) Attorney, Agent, or Firm—David E Wheeler

(57) ABSTRACT

Rubber composites, for example pneumatic tipes, can be made using seamless, tubular reinforcement (14). By pulling socks of seamless tubular reinforcement over, for example, a tire building drum (10), spliceless carcass reinforcement (18) and spliceless belts (64) can be incorporated into tires. Methods of treating the spliceless tubular material, by drawing and by adhesive coating, enhance its strength and adhesion to rubber.

6 Claims, 20 Drawing Sheets

SEAMLESS REINFORCEMENT FOR RUBBER COMPOSITION AND PRODUCTS INCORPORATING SUCH MATERIAL

TECHNICAL FIELD

The invention relates to a method of making components for laminated rubber products such as tires, and tire components and tires made by said method.

BACKGROUND ART

In the conventional method of making tires sized for use on passenger cars, light trucks and trucks, gum rubber plies and composite plies are laid up in sequence on a building drum and shaped into a tire. Prior to the building of the tire, reinforced composite plies such as carcass plies and belt plies are calendered to encase reinforcing cords in the ply rubber, and in some applications, belt packages are preassembled on a belt building drum. This procedure involves many interrelated steps and requires an inventory of each component and consequent warehousing of each component.

In addition, conventional preassembled tire components, by definition, have inherent boundaries, such as ply ends, belt edges, etc. that must be spliced, or in the case of belt edges, must be encased in rubber or other special components, to help prevent separation from other components in the tire.

It is a continuing goal in the art to reduce the number of steps in building a tire and to reduce the inventory of component parts that must be maintained. In the present invention this goal is accomplished, and in addition, carcass splices are eliminated, and in some embodiments belt edges are eliminated, as are additional components that are sometimes used to protect belt edges.

SUMMARY OF THE INVENTION

A method for building a pneumatic tire comprises the steps of (a) laying up tire components on a tire building drum up to the point before a carcass ply is laid down on the building drum, (b) pulling a full sock of seamless netting material over and in surrounding relationship to the drum and previously applied tire components, and (c) continuing to build a tire without the addition of a carcass ply. The method may further comprise the step of pulling additional layers of belt width socks of seamless netting material over the full sock and locating the belt width socks so as to form belts in a shaped tire.

The method may comprise the further additional step of preparing the seamless netting material by dipping the material in an adhesive.

The netting material may be prepared to have 5 to 40 epi cords or filaments in a nominal warp direction and 5 to 40 epi cords or filaments in a nominal weft direction.

The netting material may be selected from the group consisting of polyamide, aromatic polyamide, polyester, polyolefin, steel filaments, steel cords, brass coated steel cords or filaments, and mixtures thereof.

Also included in the invention is a pneumatic tire comprising at least a pair of parallel annular beads, a sock of seamless netting material wrapped around said beads, an unreinforced inner liner disposed radially inwardly of the seamless netting material, tread rubber disposed radially outward of the netting material in a crown area of the tire, and sidewalls disposed between the tread and the beads. Belt reinforcement may be disposed in the tire between the seamless netting material and the tread.

Also provided is a tire carcass comprising at least a pair of parallel annular beads, a sock of seamless netting material wrapped around the beads, an unreinforced inner liner disposed radially inwardly of the seamless netting material, gum rubber disposed radially outward of the netting material, and sidewalls disposed adjacent to the beads.

Also provided is a tire carcass comprising at least a pair of parallel annular beads, a sock of seamless netting material wrapped around the beads, an unreinforced inner liner disposed radially inwardly of the seamless netting material, gum rubber disposed radially outward of the netting material, tread rubber disposed over the gum rubber in a crown area of the tire, and sidewalls disposed between the crown area and the beads.

Also provided is a method for building a pneumatic tire comprising the steps of (a) placing an inner liner and other optional gum components on a tire building drum, (b) pulling a sock of seamless netting material over and in surrounding relationship to the drum and previously applied tire components, (c) covering or coating the seamless netting material with at least one additional layer of rubber, (d) setting beads over the additional rubber layer on the tire building drum, and (e) covering the beads and the additional rubber layer with at least one further layer of gum rubber to form a first stage carcass. The method may comprise the further step of adding tread rubber to said first stage carcass on the tire building drum.

Additional steps may include expanding said first stage carcass to contact a preformed belt package and tread or expanding the first stage carcass in a tire mold and curing a tire.

Also provided is a tubular netting material comprising interwoven or interlocked thermoset polymer filaments or cords wherein the netting forms a seamless woven structure having nominal warp and weft filaments wherein the filaments having a round, oblong, trapezoidal, flat cross section shape, wherein the filaments form at least one regular pattern in the tubular material throughout its length, and wherein said filaments/cords are coated with an adhesive material. In one embodiment the tubular netting material may have a greater number of nominal warp filaments than the number of nominal weft filaments.

Also provided is an apparatus for making tubular netting material comprising an extruder having a die with inner and outer counter rotating circular heads, orifices in said heads being shaped to provide robust filaments in at least one dimension when molten material is extruded through the heads, and means for varying the speed of rotation of the inner and outer heads. The apparatus may include means for coating filaments/cords of the netting with an adhesive and means for drawing the tubular material to elongate the tubular material 200% to 1000% along its primary axis.

Also provided is a method for forming a tubular material comprising the steps of (a) extruding a molten polymeric material through counter rotating inner and outer circular dies forming polymeric filaments which cross over each other in at least a portion of the extrusion, (b) cooling the filaments to thermoset the polymer and fuse cross over junctions between the filaments, and (c) drawing the tubular material to elongate the tube of netting material 200% to 1000% along its primary axis. The method may further comprise the step of coating the filaments with an adhesive before drawing said tubular material. The method may include the steps of obtaining dies with various orifice diameters and shapes, and changing dies based on the filament size and strength desired and varying the rotation speed of the inner and outer circular dies to be the same or different, faster or slower, or variable, depending on the extrusion pattern desired or stopping the rotation of said dies for a portion of said extrusion.

DEFINITIONS

"Apex" refers to an elastomeric wedge of material placed next to a bead to provide a smooth transition for a carcass ply turn up and to minimize flexing around the bead.

"Bead" means that part of the tire comprising an annular tensile member wrapped by ply cords and shaped, with or without other reinforcement elements such as flippers, chippers, apexes, toe guards and chafers, to fit the design rim.

"Belt" refers to a layer of parallel reinforcing cords, woven or unwoven and embedded in an elastomeric material, unanchored to the bead, and when two or more belts are assembled into a "Belt Package" or "Belt Structure", the package or structure has cord angles of 17 to 27 degrees with respect to the equatorial plane of the tire.

"Bias Ply" refers to a carcass with reinforcing cords extending diagonally from bead core to bead core at about 25 to 50 degrees with respect to the equatorial plane of the tire. When more than one carcass ply is used in a tire, reinforcement cords usually run at opposite angles in adjacent plies.

"Building Drum" refers to a cylindrical device on which shapeless material is applied (such as elastomeric tire components) to establish their relationship to one another and to make possible handling of the assembled components for shaping.

"Carcass" means the tire structure apart from the belt structure, tread, undertread, and sidewall rubber over the plies, but including the beads.

"Chafer" refers to a narrow strip of material placed around the outside of the bead to protect cord plies from the rim, distribute flexing above the rim, and to seal the tire with the rim.

"Cord" refers to a plurality of filaments or yarns twisted together to form a single string or reinforcement element.

"Crown" refers to the circumferentially outermost portion of the carcass substantially within the width limits of the tread.

"Equatorial plane (EP)" means the plane perpendicular to the tire's axis of rotation and passing through the center of its tread.

"Filament" refers to a single strand or tow of yarn. Sometimes referred to as a cord ply.

"First Stage Carcass" refers to a cylindrical carcass (non expanded) including all its component parts and standing alone apart from a tire.

"Second Stage Carcass" refers to an expanded carcass including all of its component parts but standing alone from a tire.

"Inner Liner" refers to a layer or layers of elastomer (usually halobutyl rubber) that form the inside surface of a tubeless tire and that contains the inflating fluid within the tire.

"Pantographing" refers to the changing of the angles between reinforcement cords when a tire or carcass construction is expanded as it is shaped into a torus.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Shoulder" refers to the upper portion of sidewall just below the tread edge.

"Sidewall" means that portion of a tire between the tread and the bead.

"Splice" refers to the overlapping or abutting of ply ends when the ply is deployed into a circular shape.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is., in a plane parallel to the axis of rotation of the tire.

"Turn up ply" refers to an end of a carcass ply that wraps around one bead only.

"Wedge" refers to elastomeric material that is placed between the edges or above the edges of belts in a belt package to help flatten the crown area of the tire.

DETAILED DESCRIPTION OF THE INVENTION

Figure 1:
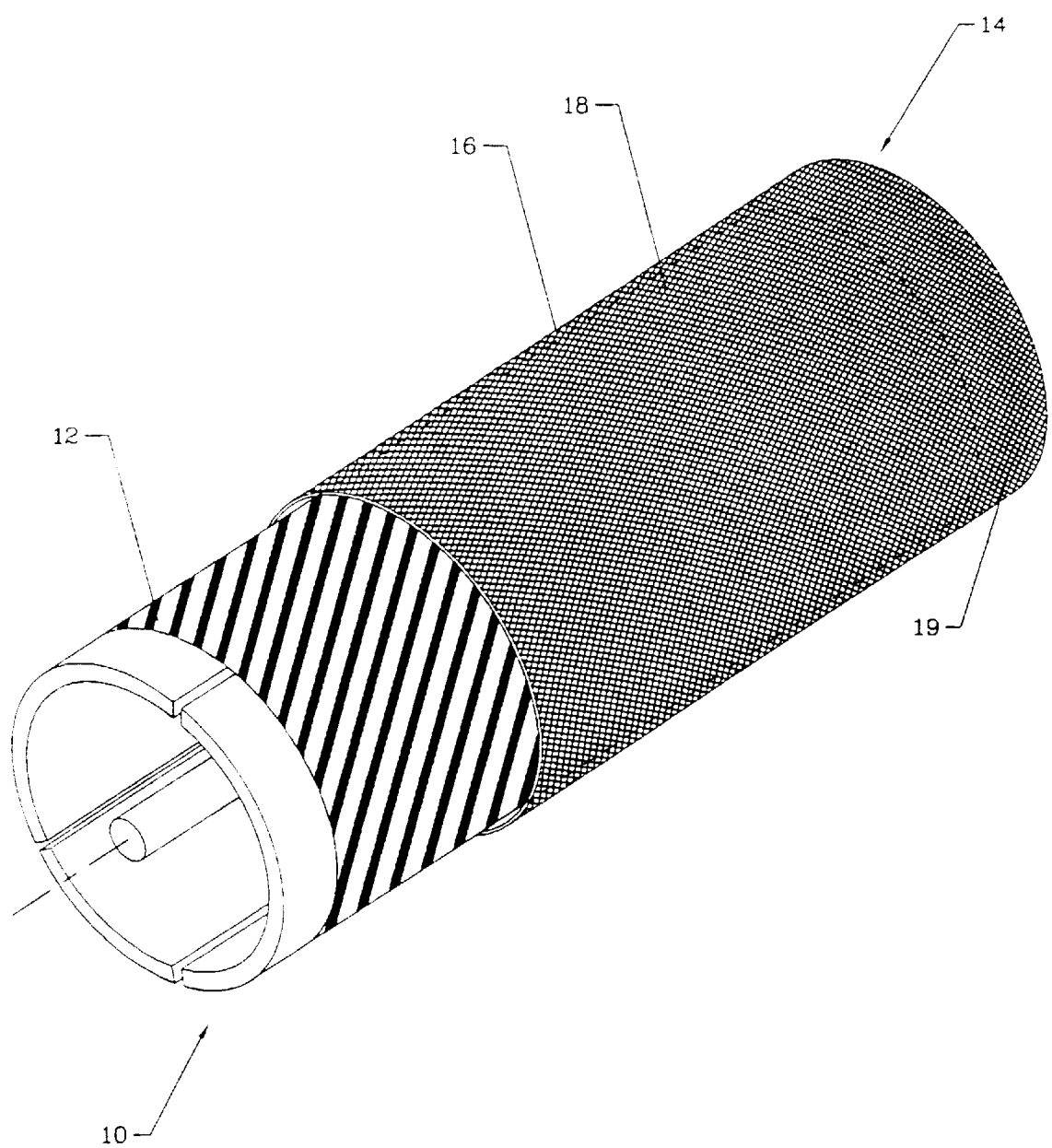
FIG. 1 illustrates a sock of reinforcing netting material being pulled onto a building drum over gum rubber inner liners, optional chafers and other tire components.

With reference now to FIG. 1, a building drum 10 is used in the construction of a tire wherein at least one gum layer 12, and optionally other components are applied to the building drum using techniques known in the art. At the point in the construction of a conventional tire where a composite carcass ply would be applied to the building drum, a sock 14 of interlinked polymer filaments (netting) is pulled over the drum and the previously applied gum components from one side of drum 10. As used herein, "Sock" refers to a tubular, spliceless fabric netting comprised of nominal warp and nominal weft cords or filaments. By "nominal warp" and "nominal weft" it is meant that the filaments are at a opposed angles to each other and this designation is used because the filaments are not warp and weft filaments in the conventional sense since the nominal warp filaments and the nominal weft filaments, in most cases, will have the same physical characteristics, and in many cases neither filament will be oriented in the linear or machine direction of the fabric.

In an illustrated embodiment, nominal warp filaments 16 and nominal weft filaments 18 in sock 14 are fused at their points of intersection 19. Filaments 16 and 18 may be made of thermoplastic polymeric material. Examples of suitable thermoplastic materials may be selected from the group consisting of nylon, polyalkylene, and polyester and mixtures thereof.

To distinguish such fused filament netting from woven or knitted structures described below, such polymer netting is sometimes referred to herein as "mesh netting".

The mesh netting is made by simultaneously extruding nominal warp and nominal weft molten filaments of thermoplastic material wherein the opposed molten streams cross and are fused together when their temperature drops below their melting point. Netting made by such processes are available from Applied Extrusion Technologies, 96 Swampscott Road, Salem, Mass.; Conweb Plastics, 2640, Patton Rd, Rockville, Md. 55113; NSW Corporation, a division of Siemans, 530 Gregory Ave., Roanoke, Va. 24016; and various other suppliers.

The end count, ends per inch (epi) of the mesh netting material as well as the diameter and cross sectional shape of each filament can be controlled by the number, shape and spacing of the holes and the size of the holes in the extruder dies.

In an alternative embodiment, interlinked netting material may be knitted or woven, using any twisted or untwisted fabric or wire cord or cable. Interlinked netting can be made having warp and weft relationships similar to fused polymer netting described above, except that intersections of the warp and weft filaments are not fused, and the warp and weft are moveable relative to each other within the limits defined by the structure of the netting material.

The sock of netting material used for the reinforcement ply in the tire is made to have a diameter that permits the deformable sock of reinforcement material to be easily pulled over the drum but is not so loose as to cause wrinkles when the beads and other components are applied to the reinforcement material on the drum. In some cases the sock of netting material may be "drawn" as described below, so that its diameter is smaller than the building drum, but because of its deformability and its inherent stretchability, the netting material can be stretched to easily fit over the building drum.

The drawing of filament materials is important to their physical properties as described by Causa et al. in U.S. Pat. No. 5,513,683 and art cited therein. Because of the nature of the netting structure described herein, "drawing" embraces a "primary" drawing of the netting structure, and a "secondary" drawing of the filamentary material.

The sock of netting material may be engineered to be stretchable at least to the diameter of a tire in which it is to be used, and may be stretchable to a diameter greater than the diameter of the tire, to provide a balance between restriction properties required by a ply and flexibility needed for the tire to undergo normal deformation in its use.

Figure 2:
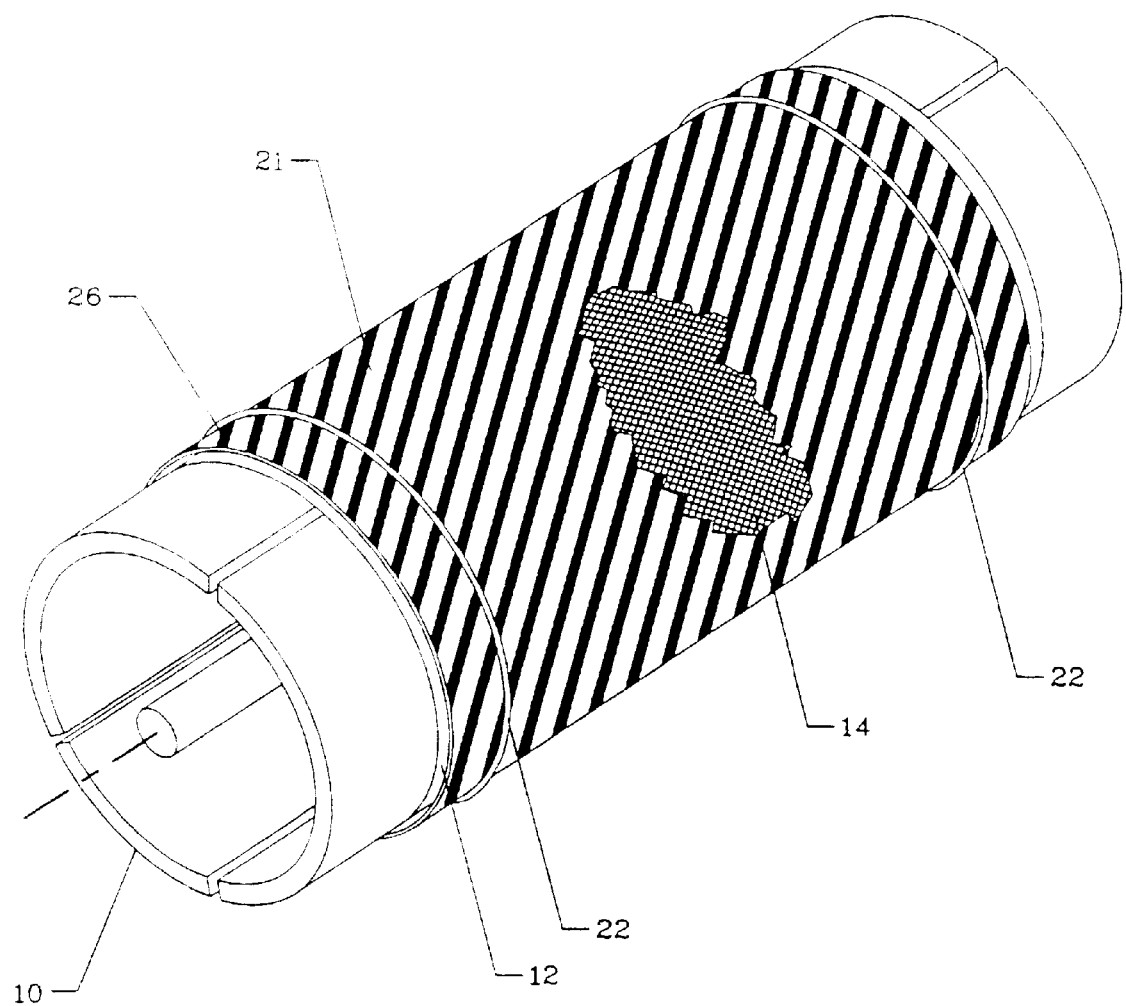
FIG. 2 illustrates a building drum where beads have been applied over rubber placed on the reinforcing netting material.

With reference now to FIG. 2, after netting reinforcement material 14 is in position on building drum 10, an additional layer of rubber 21 may be applied over the netting material, and then beads 22 are moved into position.

Figure 2A:
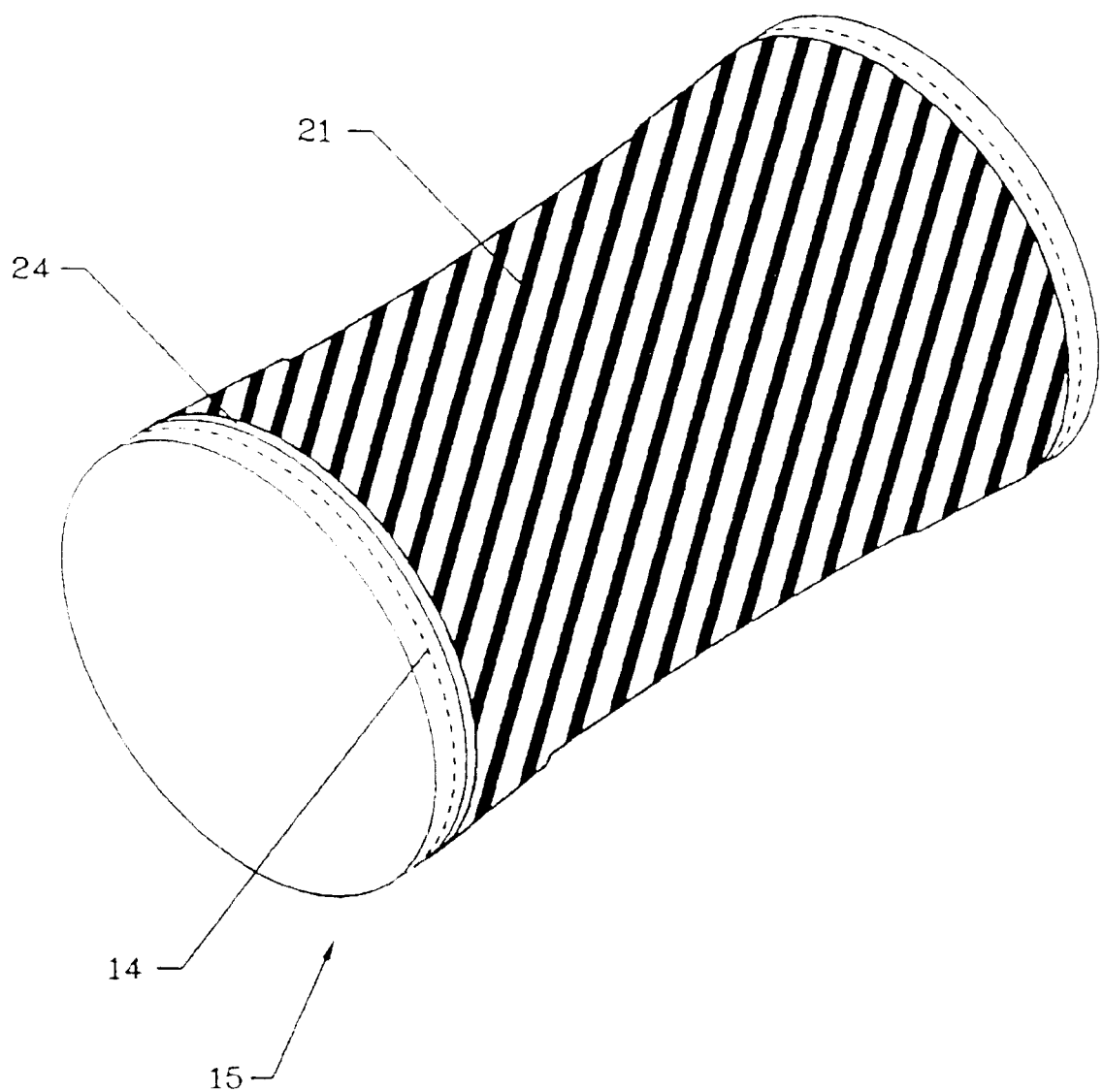
FIG. 2a illustrates a first stage carcass of the invention with sidewalls.

With reference to FIG. 2a, with the possible addition of optional apexes, wedges and other components peculiar to the particular tire construction being made, the construction, or first stage carcass 15 can be removed from the drum and placed in storage, or can be further assembled to provide a tire construction by placing the first stage carcass in a tire mold where the carcass is expanded to contact and adhere to a preassembled belt package and tread, which are then cured together in the mold.

Figure 2B:
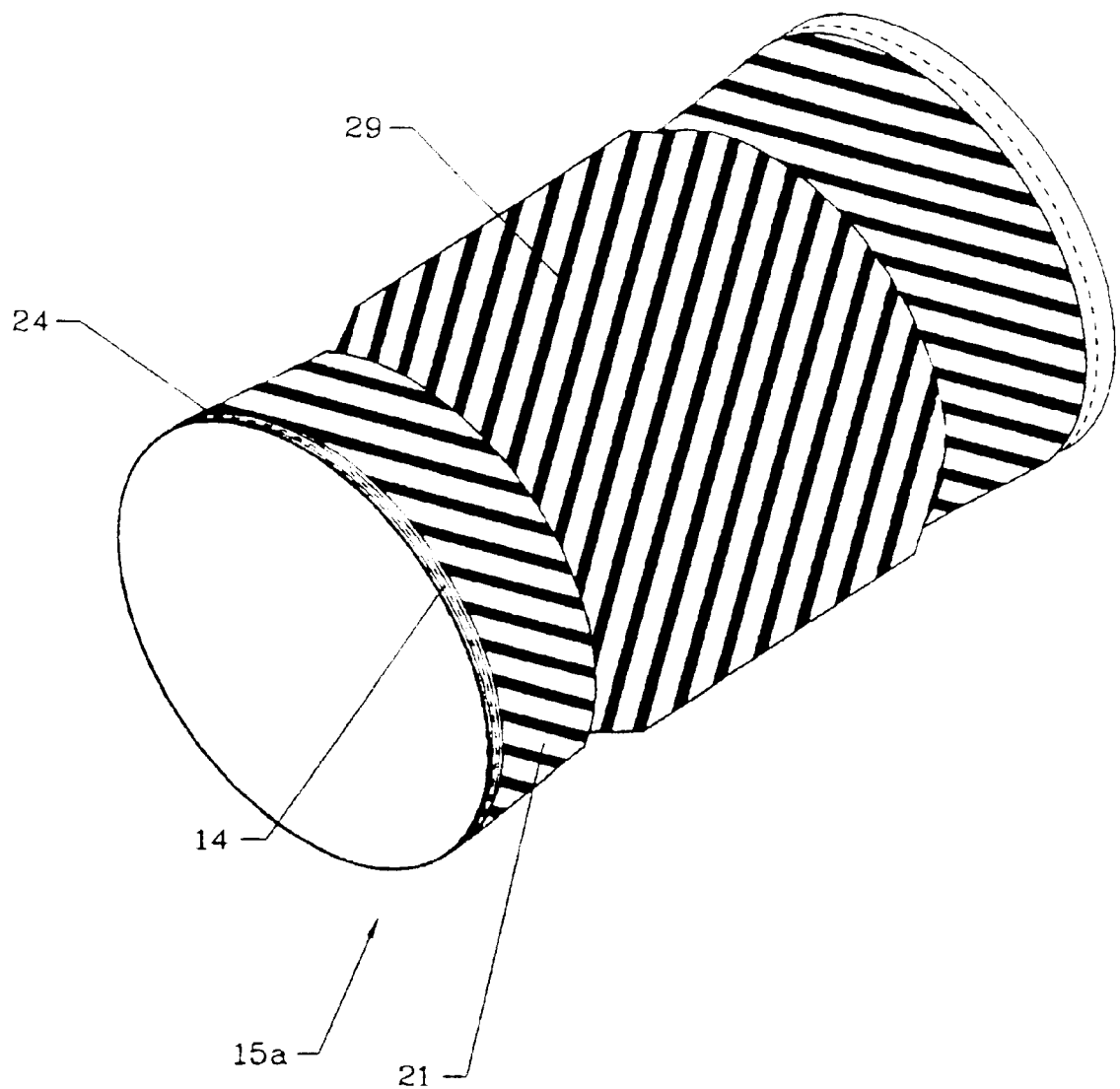
FIG. 2b illustrates a first stage carcass with tread and sidewalls.

With reference to FIG. 2b, in an alternative tire construction where no belt package is required, tread 29 can be added to the first stage carcass on the drum before it is removed from the drum, and the first stage carcass/tread 15a can be expanded in a tire mold and cured.

Those skilled in the art will recognize that there are other methods of using a first stage carcass in a tire assembly, for example, the carcass can be expanded and adhered to a preassembled belt package and tread in a separate step before placing the preassembled green tire in the curing mold. Other methods of using the preassembly of the invention in constructing tires will be apparent to those skilled in the art.

Figure 3:
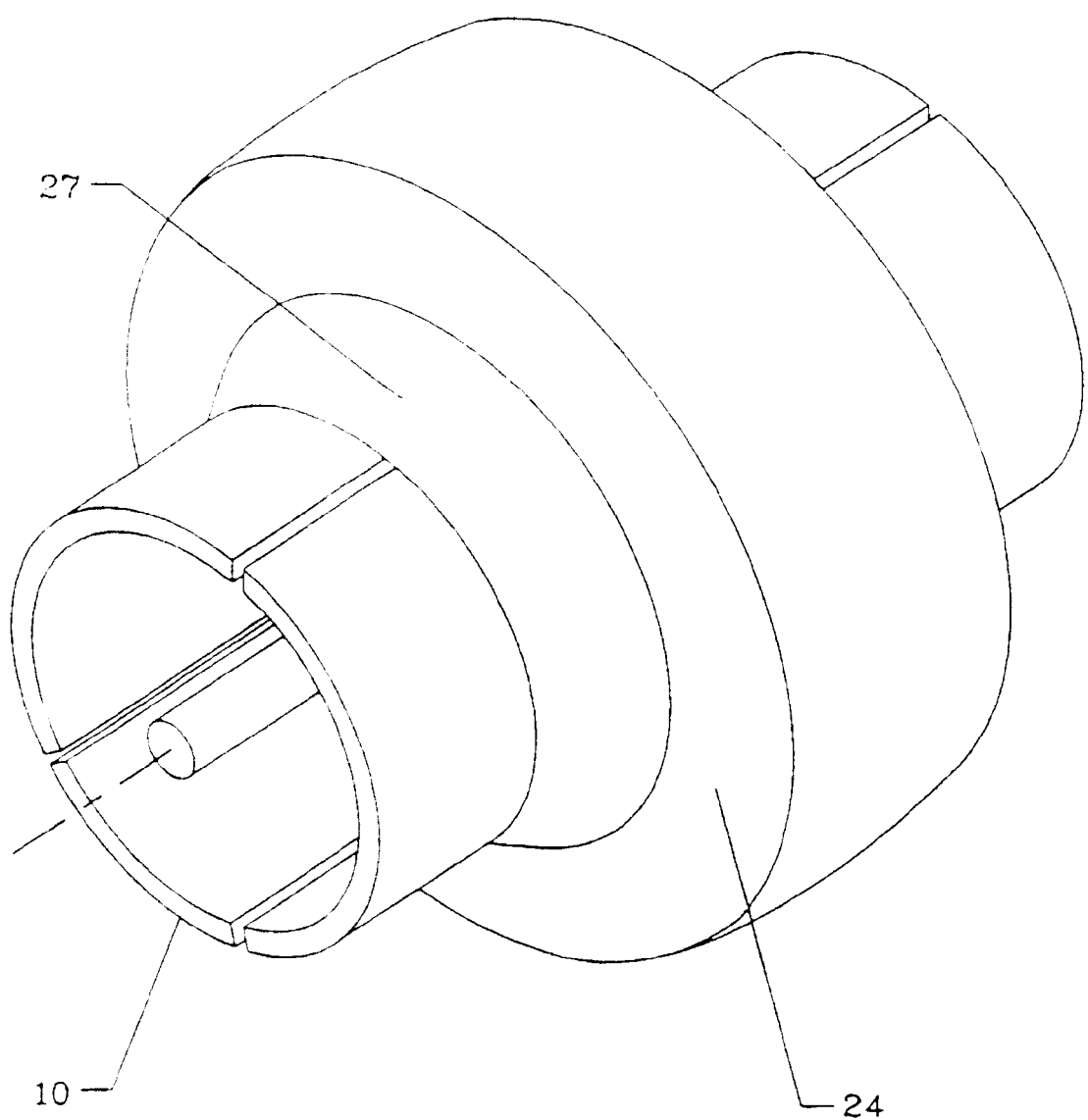
FIG. 3 illustrates an expanded second stage carcass.

In an alternative method of building a tire, with reference now to FIG. 3, building drum 10 may be activated to expand the tire components into the shape of a tire, by shortening the drum and moving the beads closer together, and using turn up bladder 27 to turn up portion 26 of the tire components (see FIG. 2) that are not axially between the beads. When the tire building drum is activated in the expansion step to give the tire components the shape of a tire, the netting reinforcement ply 14 will become tight and the filaments of the netting material will pantograph to accommodate the tire shape. Because the filaments can be made to have great strength, and the filaments are cross connected, the tire may be constructed without additional belt reinforcement.

Also, as will be apparent to those skilled in the art, multiple layers of sock netting material may be used depending on the strength requirements of a particular tire.

Figure 3A:
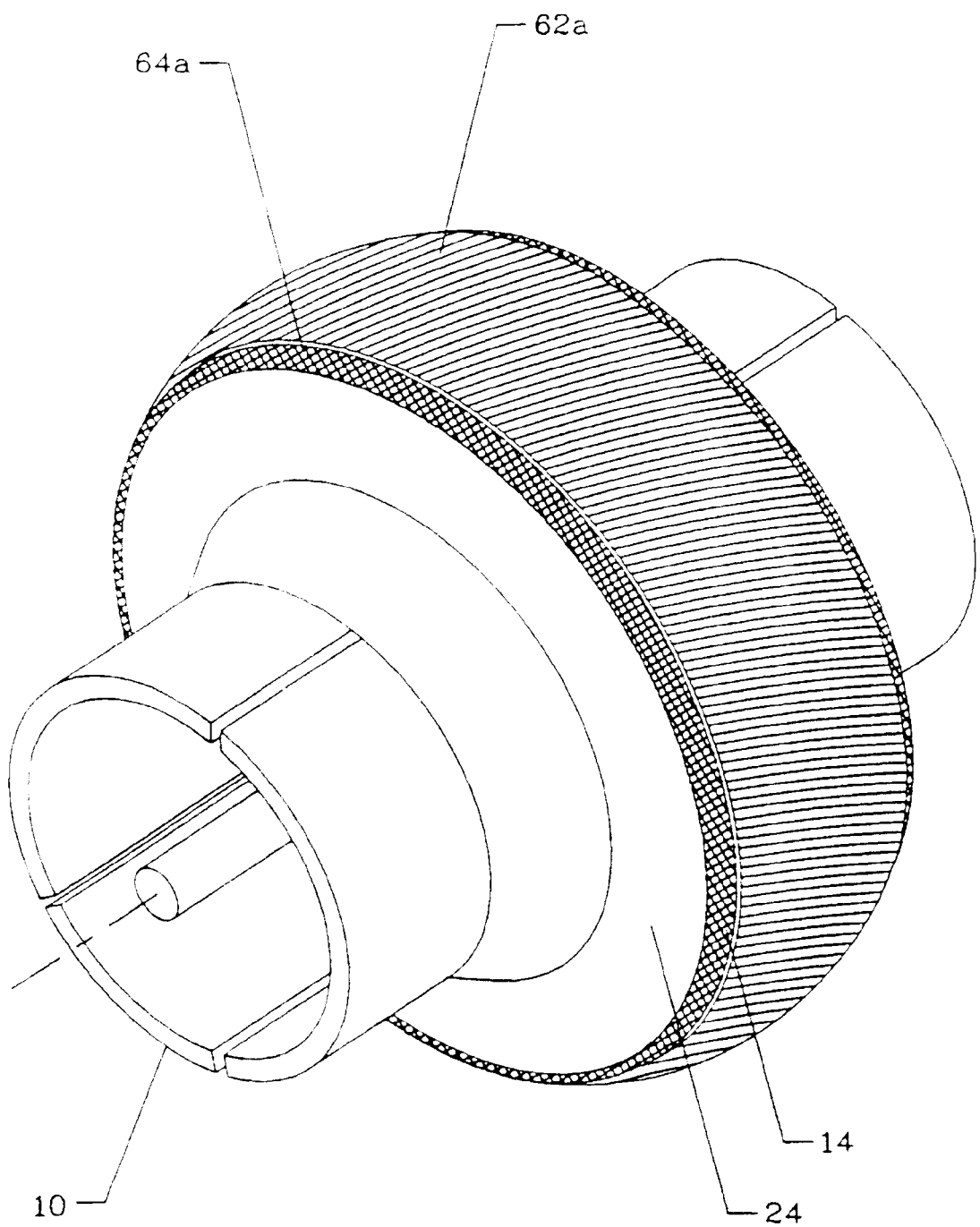
FIG. 3a illustrates the expanded carcass with the addition of other tire components.
Figure 3B:
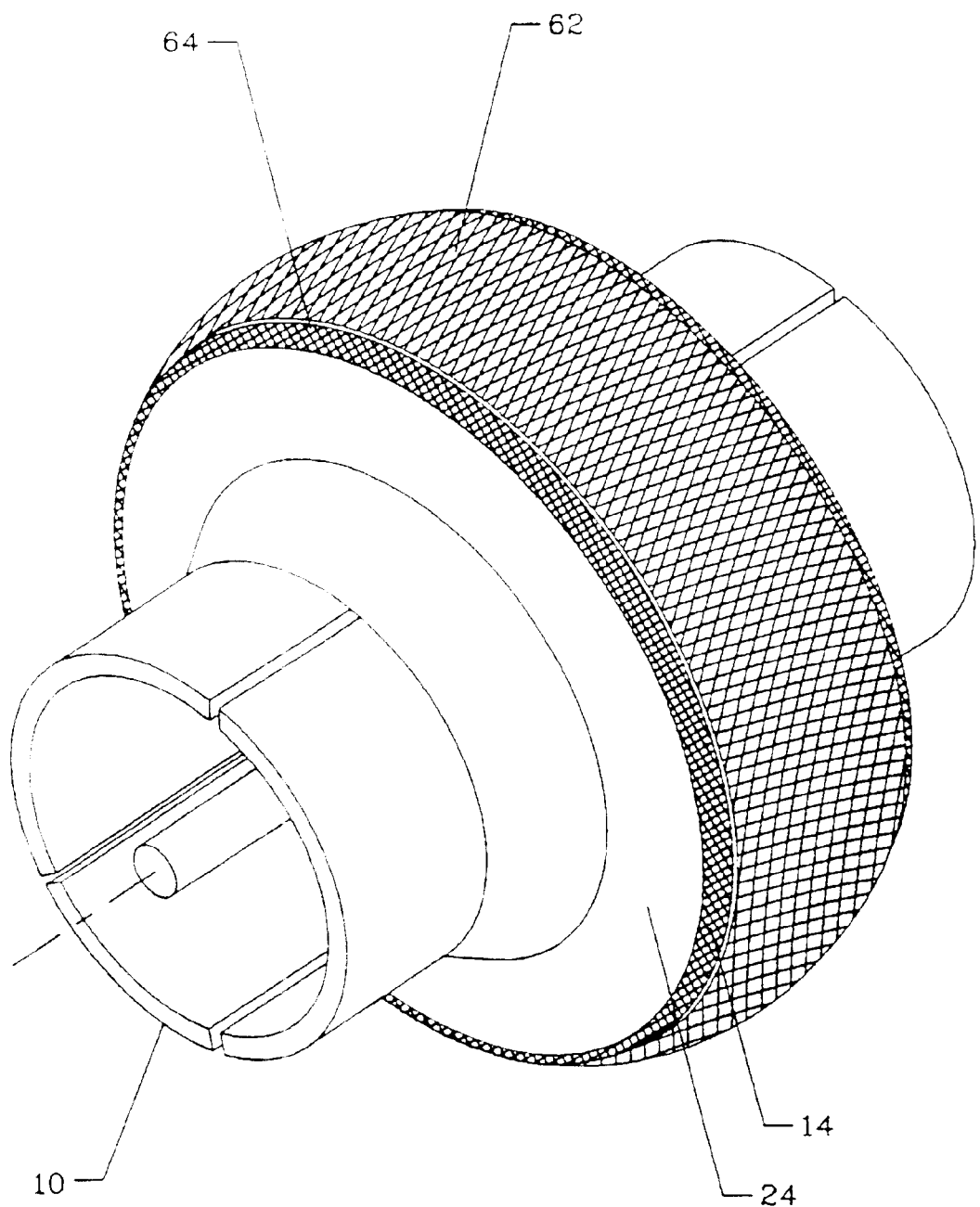
FIG. 3b illustrates an expanded carcass with alternative additional components.

With reference to FIGS. 3a and 3b, sidewalls 24 and belts may be added to the expanded tire after the expansion step. In FIG. 3a, the addition of conventional belts 62a and 64a is illustrated. In FIG. 3b, alternative belts 62 and 64 made from additional netting material have the advantage that they can be cut to size in a tube, similar to the carcass sock but having the width of a belt, and can be made spliceless.

Those skilled in the art will recognize that other techniques can be used for constructing a tire according to this method, e.g. the sidewalls can be added before the expansion step.

Figure 4:
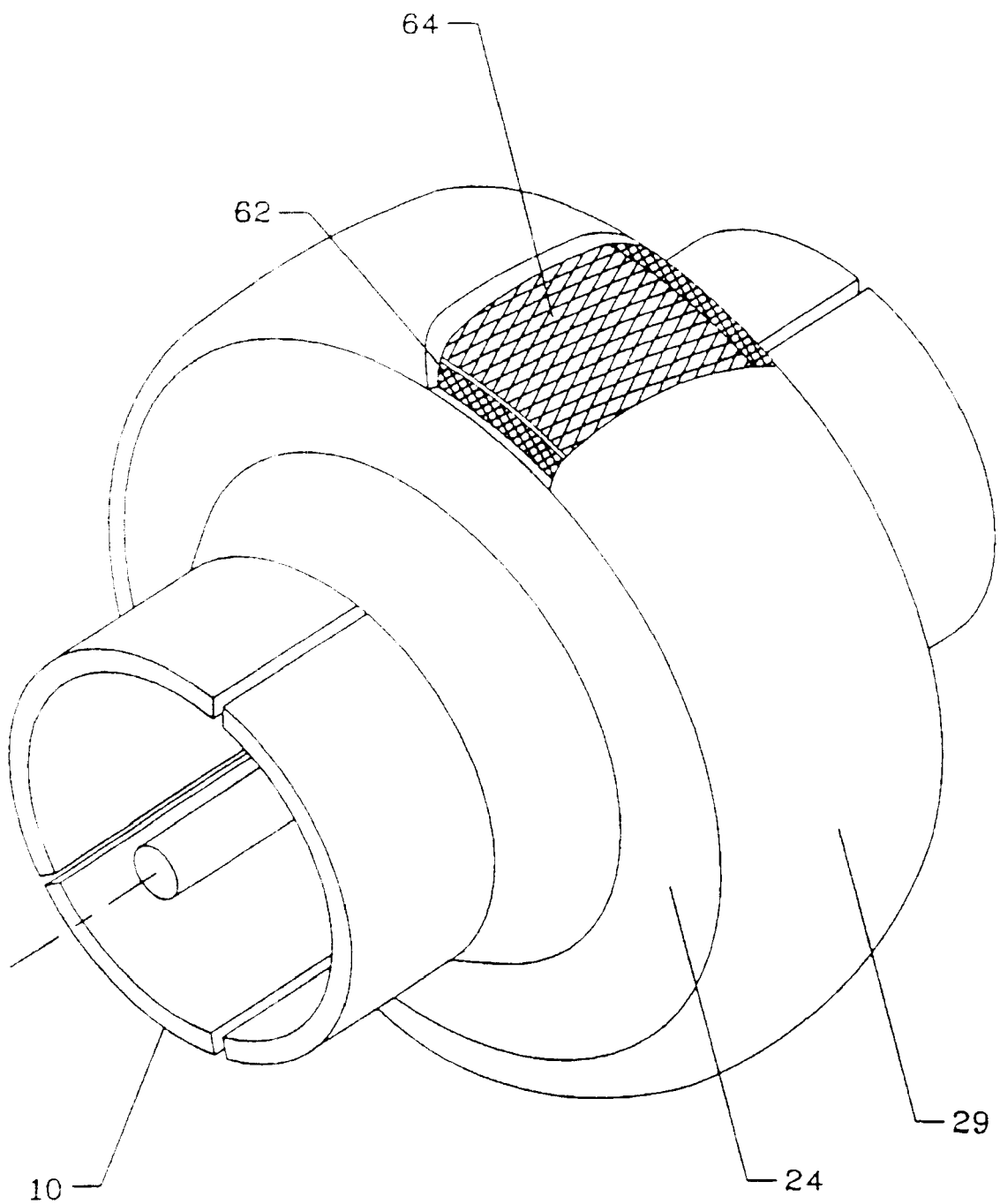
FIG. 4 illustrates application of a tread on expanded tire components.

With reference to FIG. 4, tread 29 can be added to the construction. Addition of the tread generally denotes completion of the construction of a green tire.

Figure 7:
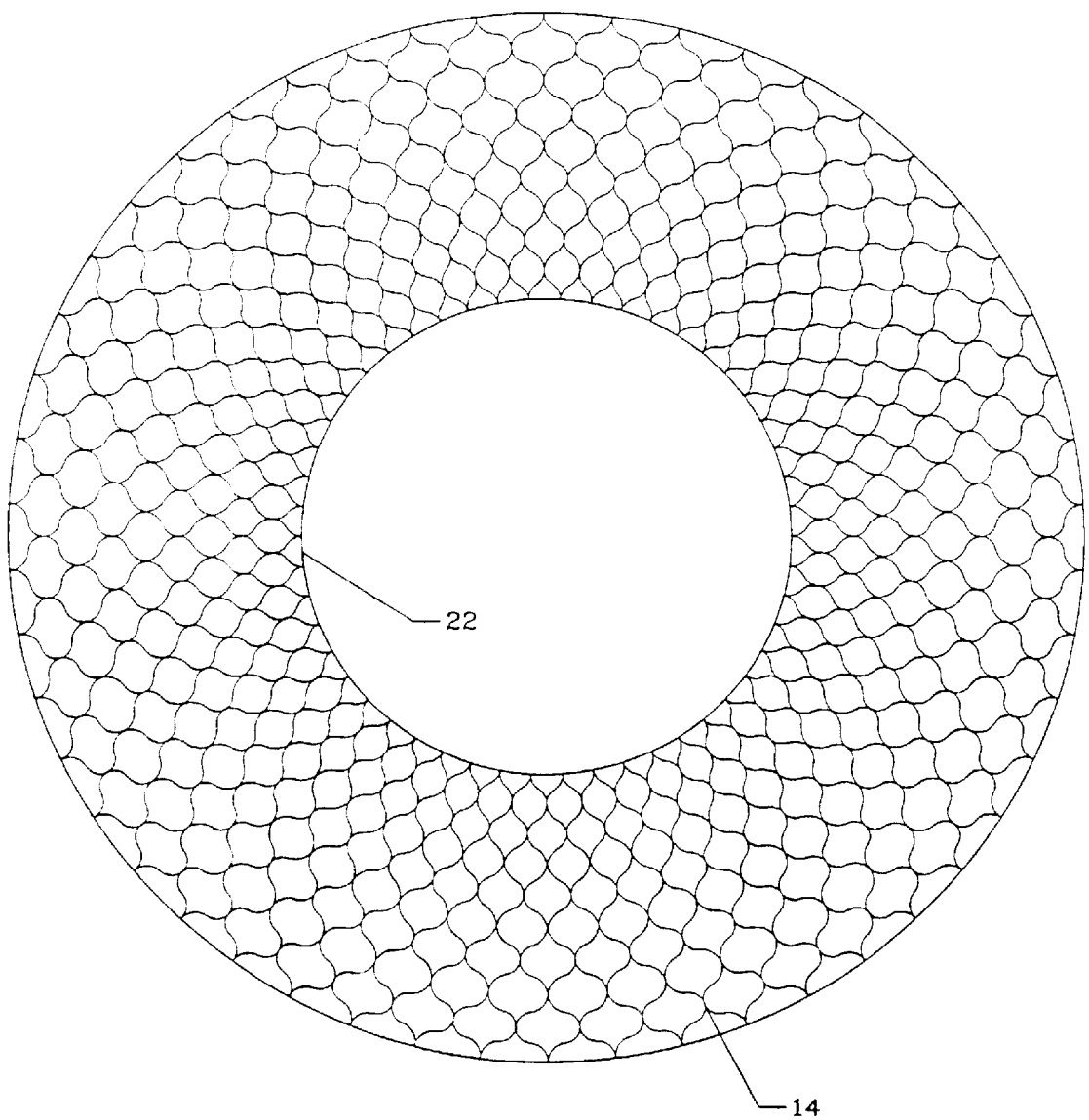
FIG. 7 illustrates pantographing of netting material on a toroidal tire.

Although the orientation of the cords or filaments in the netting 14 may be manipulated somewhat to give desired cords or filament angles in a specific tire, generally speaking the netting 14 will act much like bias plies in that the filaments 16, 18 will pantograph when the tire is expanded. The netting structure described naturally conforms in structure and adjusts its orientation to provide the most strength in the tire where the most strength is apparently needed. With reference to FIG. 7 for example, when a tire incorporating the netting material is expanded, the angles between the filaments are reduced in the direction of expansion, and nominal warp filaments and nominal weft filaments both are pulled down toward the direction of expansion, increasing the resistance against further expansion.

The netting reinforcement described herein has the advantages that the size of the filaments and the end count between points of fusion can be controlled by processing to provide additional reinforcement strength as needed. Also, the lengths of the nominal warp and weft filaments between points of fusion can be controlled in order to control how the netting pantographs thereby controlling specific filament angle orientation. This concept can be used to force the orientation of the woven filaments close to what is seen in conventional radial tires.

Also, when belt reinforcement is used in the form of netting material, the filaments are in a crossing relationship and one belt size tube of netting material may replace two belts in a conventional tire and at the same time eliminate at least two splices. The filaments in the belt and the carcass pantograph without wrinkles and the bias angle of the filaments in the sidewall eliminates bulges and valleys that are normally associated with radial ply tires. In addition, the fused netting in the crown area may offer puncture resistance.

Figure 5:
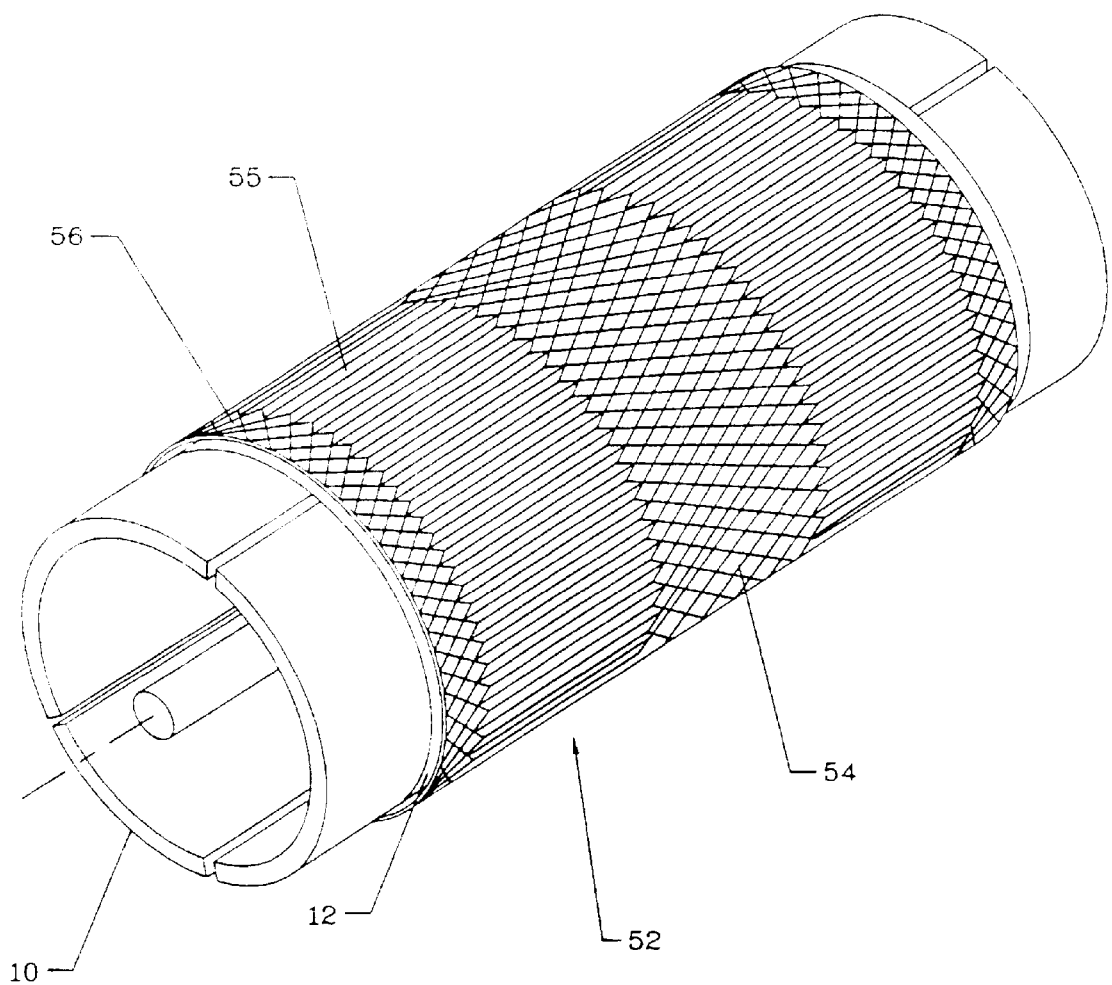
FIG. 5 illustrates an alternative netting material on a building drum.

With reference now to FIG. 5, in an alternative embodiment, the netting may be modified by controlling the flow of the filamentary material during extrusion to provide a reinforcement 52 that can replace the carcass ply and the belt reinforcement and will act in substantially the same manner as radial ply carcass reinforcement in the sidewall area of the tire. The modified reinforcement material 52 can be applied to the building drum 10 in the same manner described above with regard to reinforcement 14.

Figure 5A:
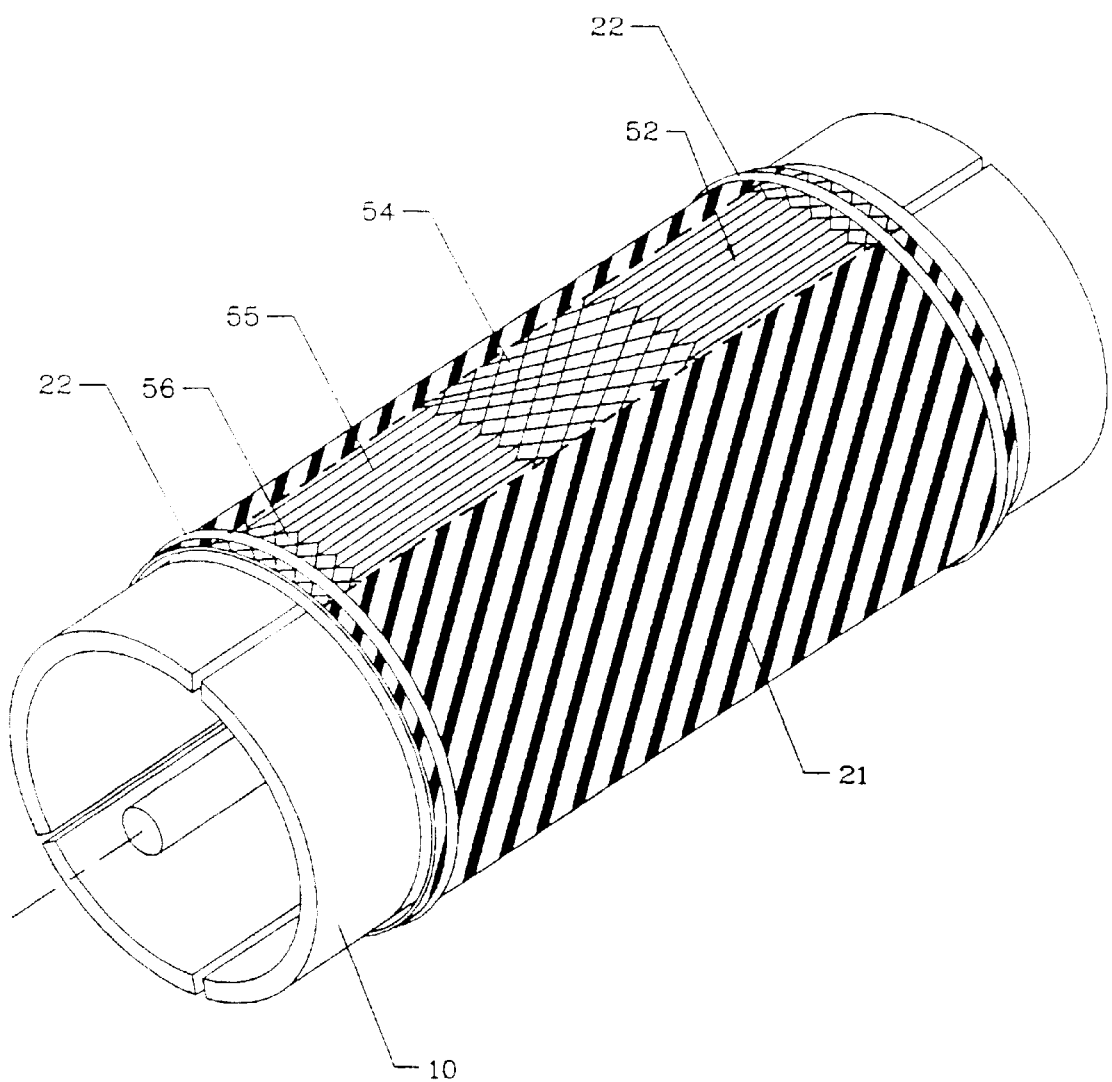
FIG. 5a illustrates alternative netting material covered by a rubber sheet on a building drum with the addition of beads.

FIG. 5a illustrates the reinforcing netting material on a tire building drum covered with an additional layer of rubber 21 and with beads 22 applied thereon.

Figure 5B:
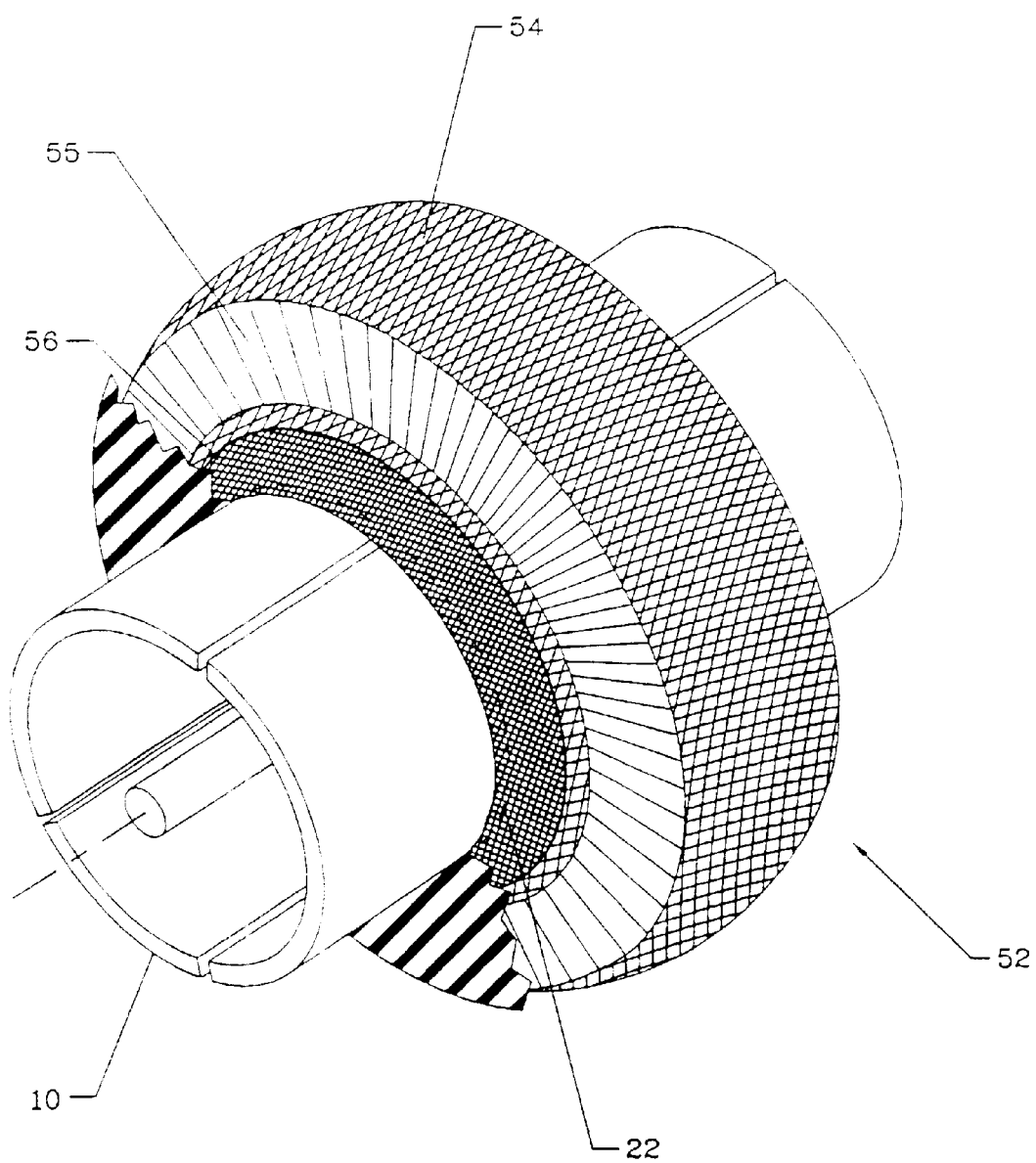
FIG. 5b illustrates expanded tire components including alternative netting material on a building drum.

FIG. 5b illustrates the orientation of the filaments of netting 52 in an expanded tire carcass. It will be noted that modified reinforcement 52 shows substantially the same orientation between the beads and the belt area of the tire, with regard to cords 55, as a conventional reinforcement in a radial carcass ply in a tire, and netting edges 56 with bias angled orientation help reinforce the bead area of the tire and may eliminate the need for toe guards, chippers, etc. Interlocked portion 54, also with bias angled orientation, provides extra reinforcement in the crown area of a tire construction and may be used in place of conventional belt reinforcement.

Figure 5C:
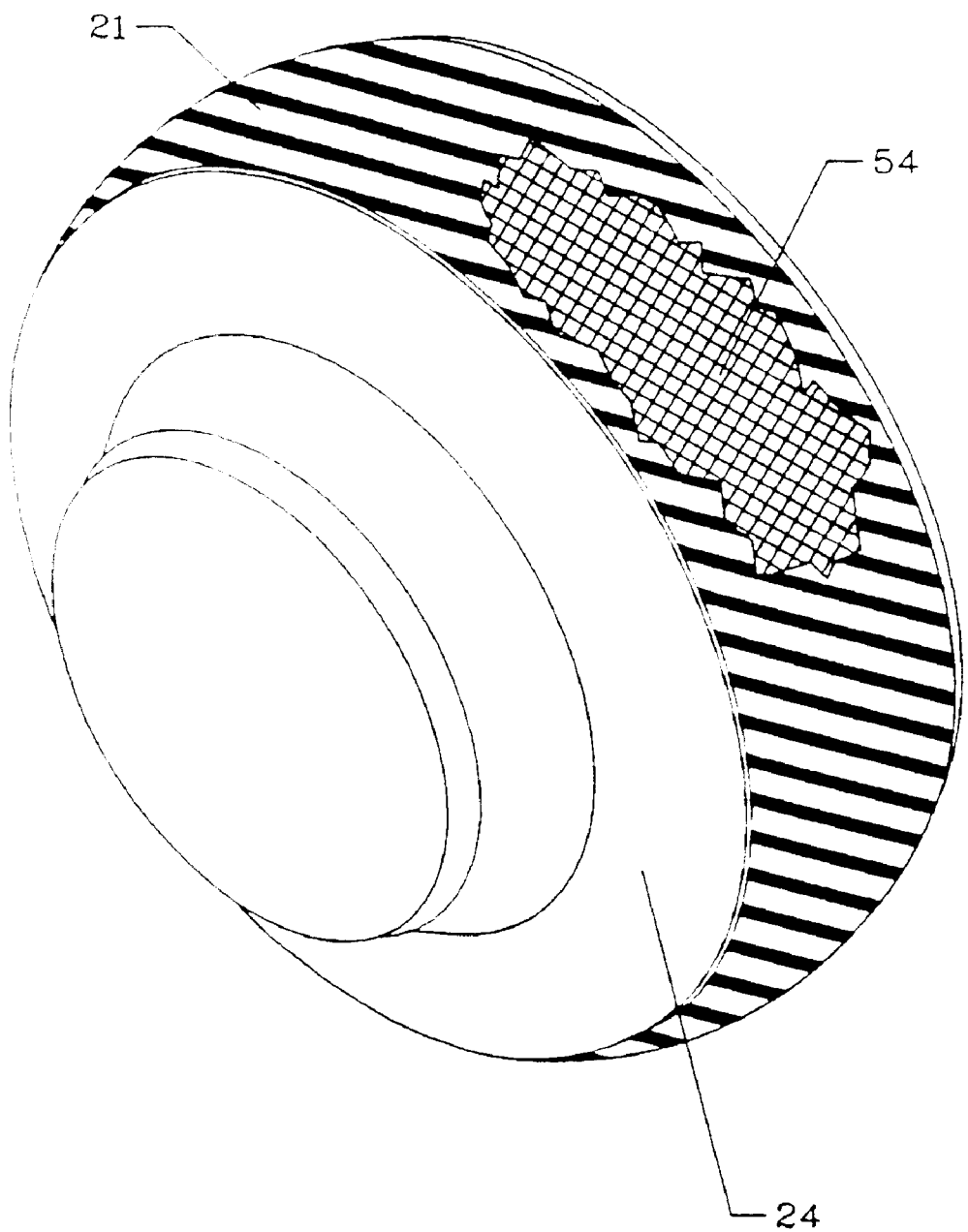
FIG. 5c illustrates a second stage carcass of the invention.
Figure 5D:
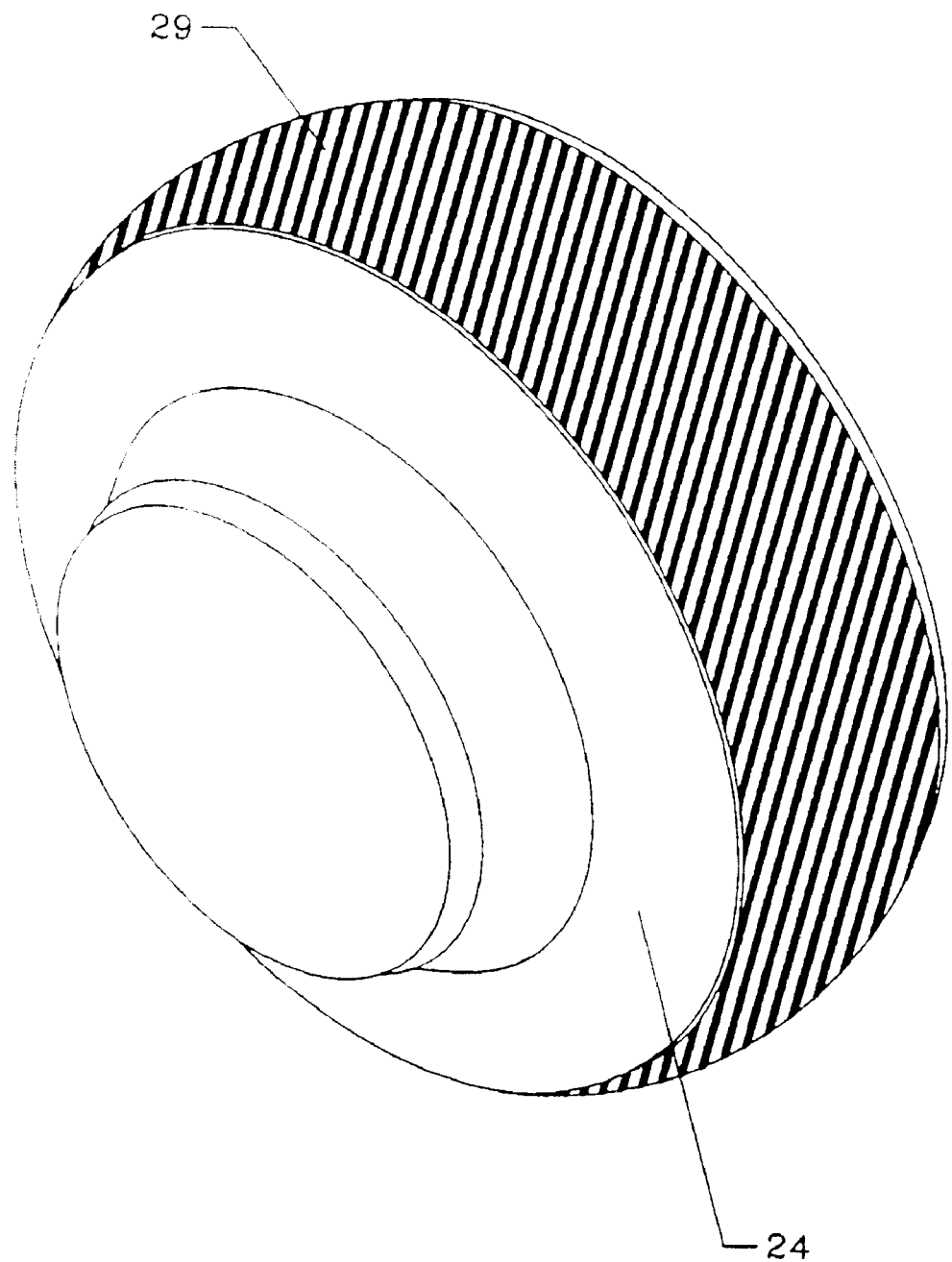
FIG. 5d illustrates a second stage carcass including tread rubber.

With reference to FIGS. 5c and 5d, second stage carcasses, with and without tread, and made using netting 52 can be stored or built into tires in the same manner as described above regarding the first stage carcasses of FIGS. 2a and 2b.

Figure 5E:
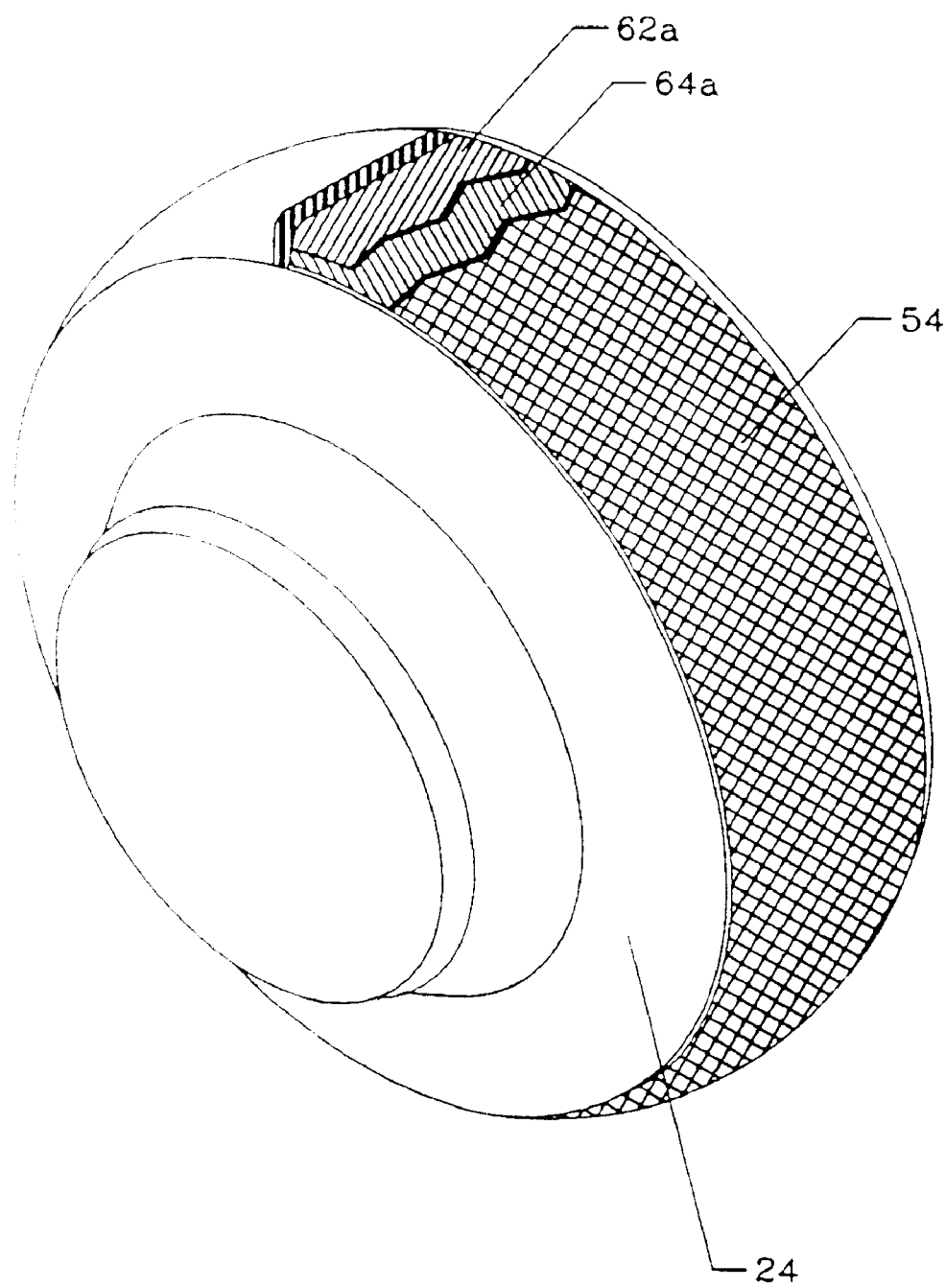
FIG. 5e illustrates an unvulcanized tire with netting material used for reinforcing plies.

FIG. 5e illustrates an optional tire construction when conventional belts 62a, 64a are used in addition to the netting reinforcement 52 with belt netting 54.

Figure 5F:
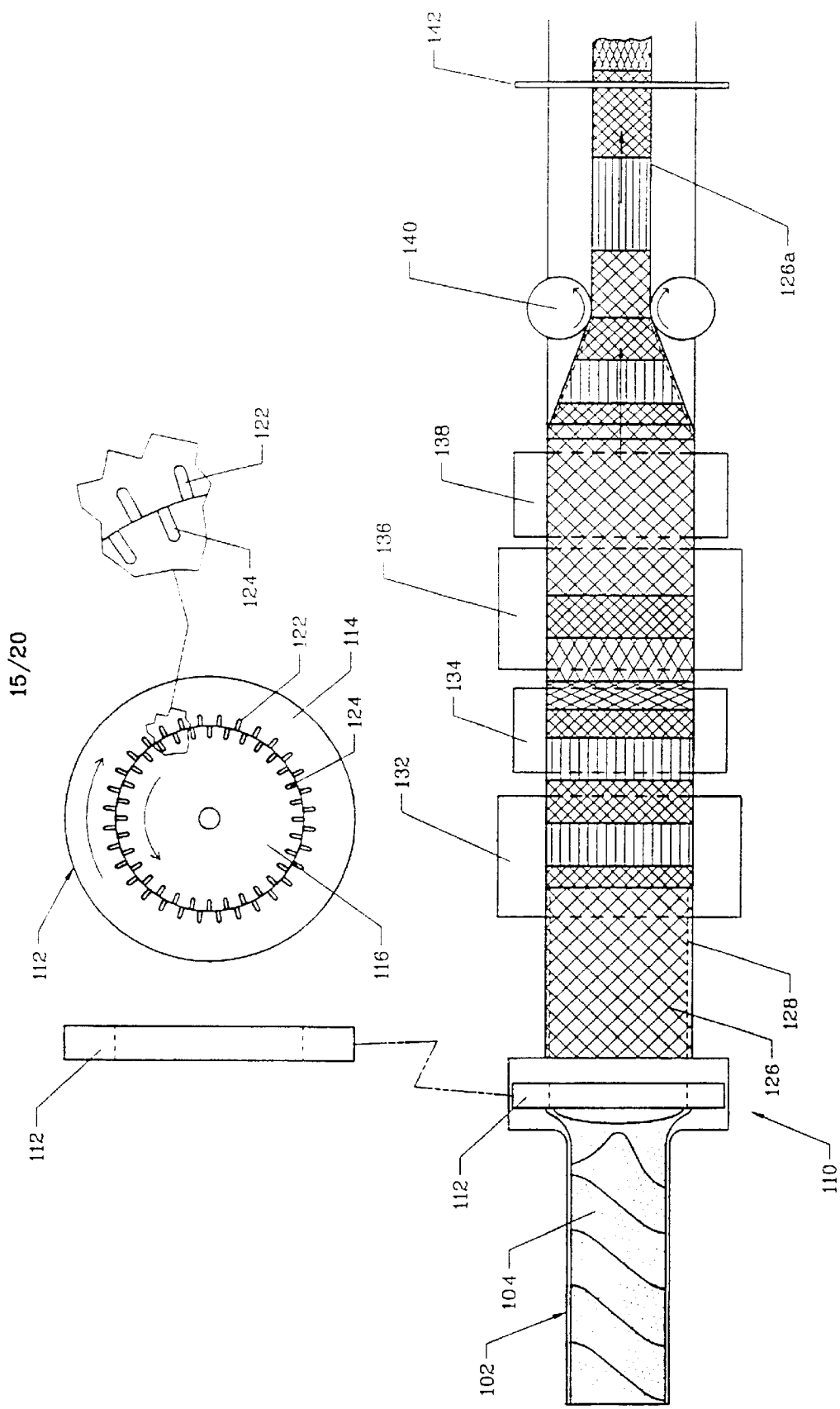
FIG. 5f illustrates equipment used in the process for making various designs of netting material of the invention.
Figure 5G:
FIG. 5g illustrates alternative netting material made for toe reinforcement when the spacing of the orifices on the inner and outer part of the extruder head are not evenly spaced.
Figure 5H:
FIG. 5h illustrates radial portion filaments of alternative netting material where a small bias angle exists between the cords.
Figure 5I:
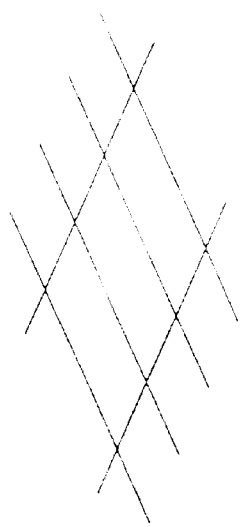
FIG. 5i illustrates alternative netting material for crown reinforcement made when the spacing of the orifices on the inner and outer part of the extruder head are not evenly spaced.
Figure 5J:
FIG. 5j illustrates filaments that are extruded at variable rates.

With reference now to FIG. 5f, apparatus 110 can be used to prepare mesh netting material of the invention. Apparatus 110 comprises a substantially conventional extruder 102, and dies 112. Such extruders may be used vertically so that gravity can be used to drive the extrudate. The extruder may be modified and used in conjunction with spray or dip units 132, 136 and heating and drying ovens 134, 138, draw down rollers 140 and cutter 142, to prepare various modified mesh netting constructions 126 that may be used in tires of the invention, and such various constructions can be made sequentially in the same run.

As is conventional in the art, extruder 102 is used to force molten material 104 used to make the mesh netting material through die 112 where the molten material 104 is pushed through orifices 122, 124 in die 112. Die 112 may preferably have a diameter up to about four times the diameter of a tire, and support tube 128 may be used to support and cool the extruded mesh netting material 126 and maintain its diameter until the molten material solidifies.

To assure adhesion of the netting material 126 to rubber components in a tire, the extruded mesh netting material may be coated with an adhesive, for example an RFL (resorcinol formaldehyde latex) adhesive, in dip or spray unit 132, and the adhesive dried in heating unit 134. A second applier unit 136, and drier 138 may be used to assure complete adhesive coverage of the netting material.

Those skilled in the art will recognize that similar coating procedures can be used to adhesively coat interlinked netting material.

In the illustrated embodiment, gravity or rollers that may be used to control the movement of the netting material through the dipping and heating units, and draw rollers 140, stretch the mesh netting 126 about 4 times its original length in the machine flow direction, i.e. along the primary axis of the drawn tube of material, and reduce its diameter to about or less than the diameter of a tire building drum.

Optionally, a liquid elastomer may be applied to the netting 126 as an alternative to applying a separate layer of rubber 21 in the tire building procedure using, for example, applier unit 136 and drier 138.

The individual socks may be separated from the extrudate using cutter 142.

The individual socks may be directed directly to tire building apparatus, or may be stored using methods that will be apparent to those skilled in the art. Also, the extrudate tube may be stored by moving the tube of material over a film of material that will not stick to an adhesive, and rolling up the tube of material over a second layer of such film. Other methods of handling the material will be apparent to those skilled in the art.

The use of the apparatus, and especially die 112, presents opportunities for engineering physical properties of the netting for specific uses. For example, orifices 122 and 124 may be made deeper and/wider to control the size and strength of the extruded filaments and the spacing and number of orifices can be changed to alter netting patterns. In addition the speed of rotation of the counter rotating inner die 116 and outer die 114 may be altered to have slower or faster speeds, same or different speeds, or variable speeds to create individual patterns for specific uses.

FIGS. 5g–5j illustrate possible patterns that may be developed in the netting material by changing the spacing of the inner and outer orifices relative to each other (5g, 5i) or rotating the inner and outer dies 114, 116 at different speeds, by slowing the dies to very low speed ((5h), as opposed to stopping the dies where parallel filaments 55 will be obtained), and by rotating the dies at variable speeds (5j). Other possible modifications of the netting pattern will be apparent to those skilled in the art based on desired engineered properties.

Figure 5K:
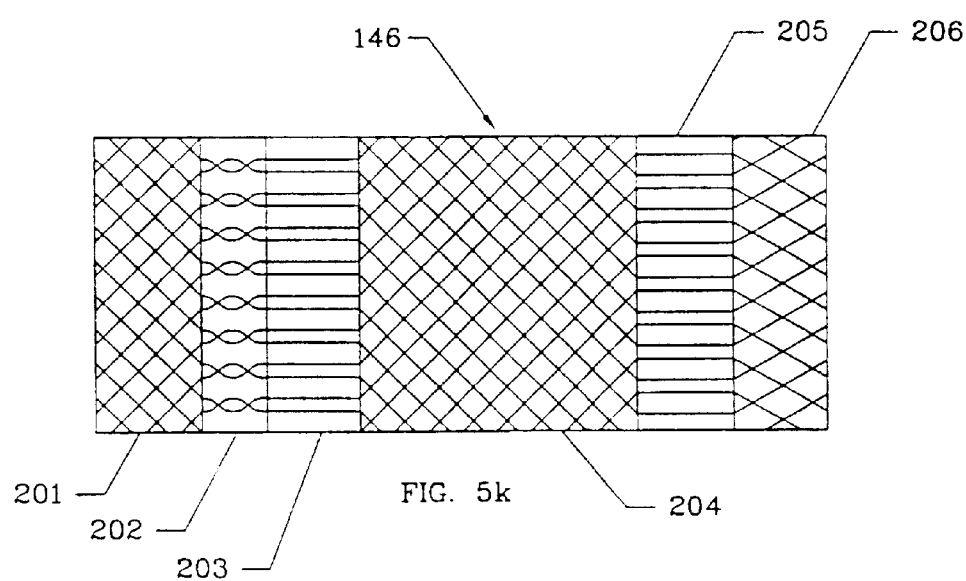
FIG. 5k illustrates a portion of extruded netting material having several netting patterns.

With reference to FIGS. 5f and 5k, the netting is extruded continuously, and in one embodiment of the invention, different netting patterns can be developed in the same continues extrusion for different tires or for different areas of the same tire.

In the alternative embodiment where liquid elastomer is not used, during the expansion step and during cure of the green tire, there is substantial rubber flow into the spaces of the netting material which causes rubber to surround the filaments.

Figure 6:
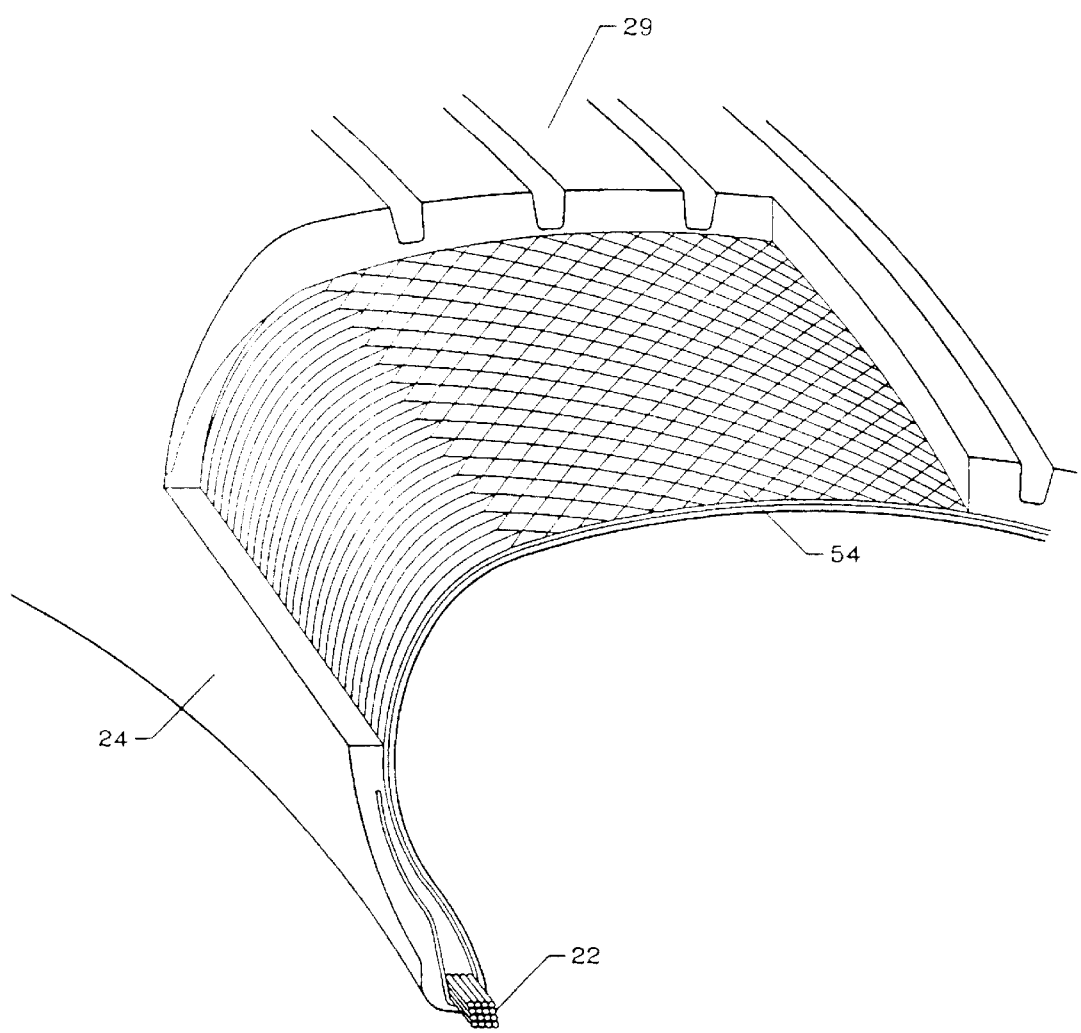
FIG. 6 illustrates a tire of the invention made using interlocked sock netting material to replace the carcass ply and the belts.
Figure 6A:
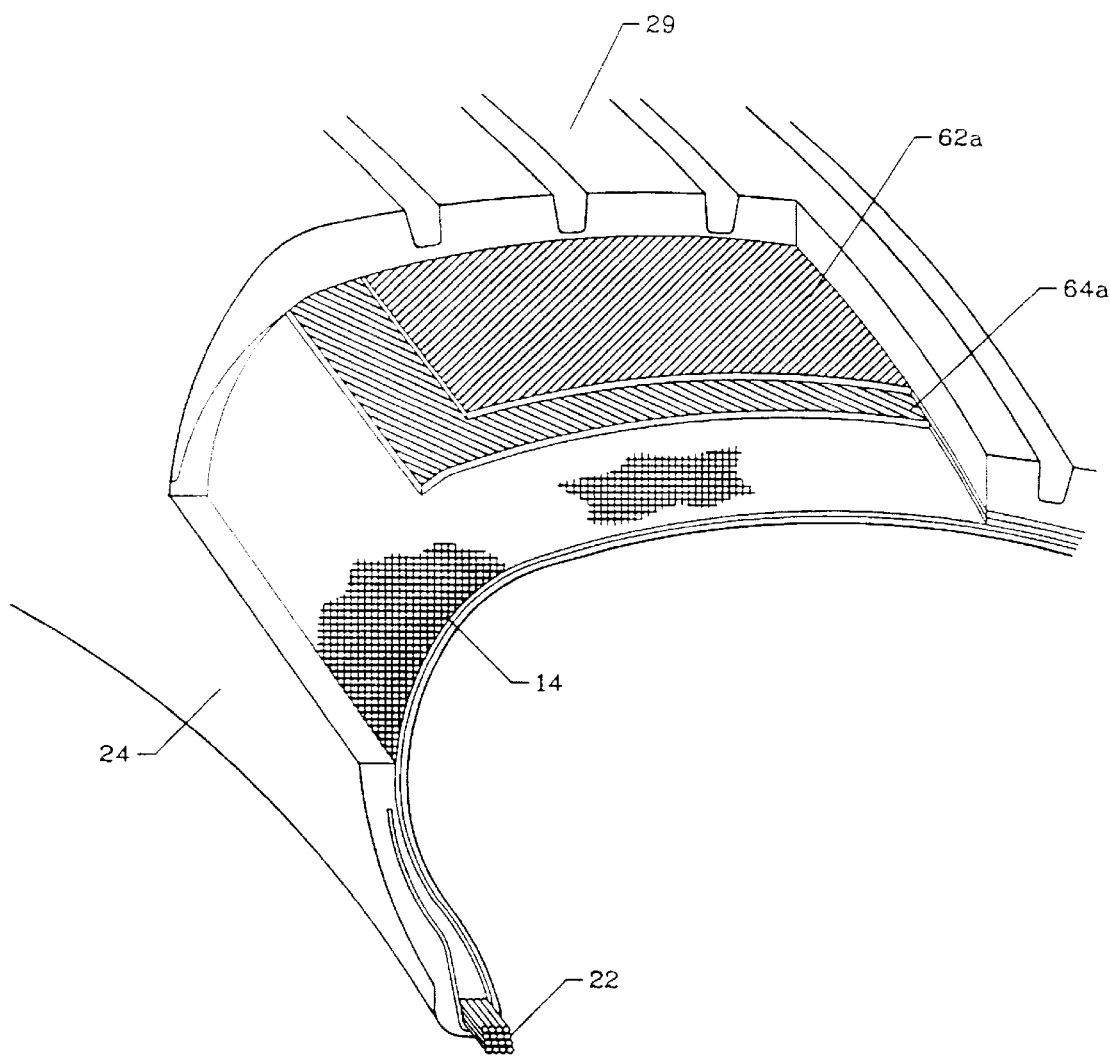
FIG. 6a illustrates a tire of the invention made using sock netting material as the ply reinforcement material and conventional belts.
Figure 6B:
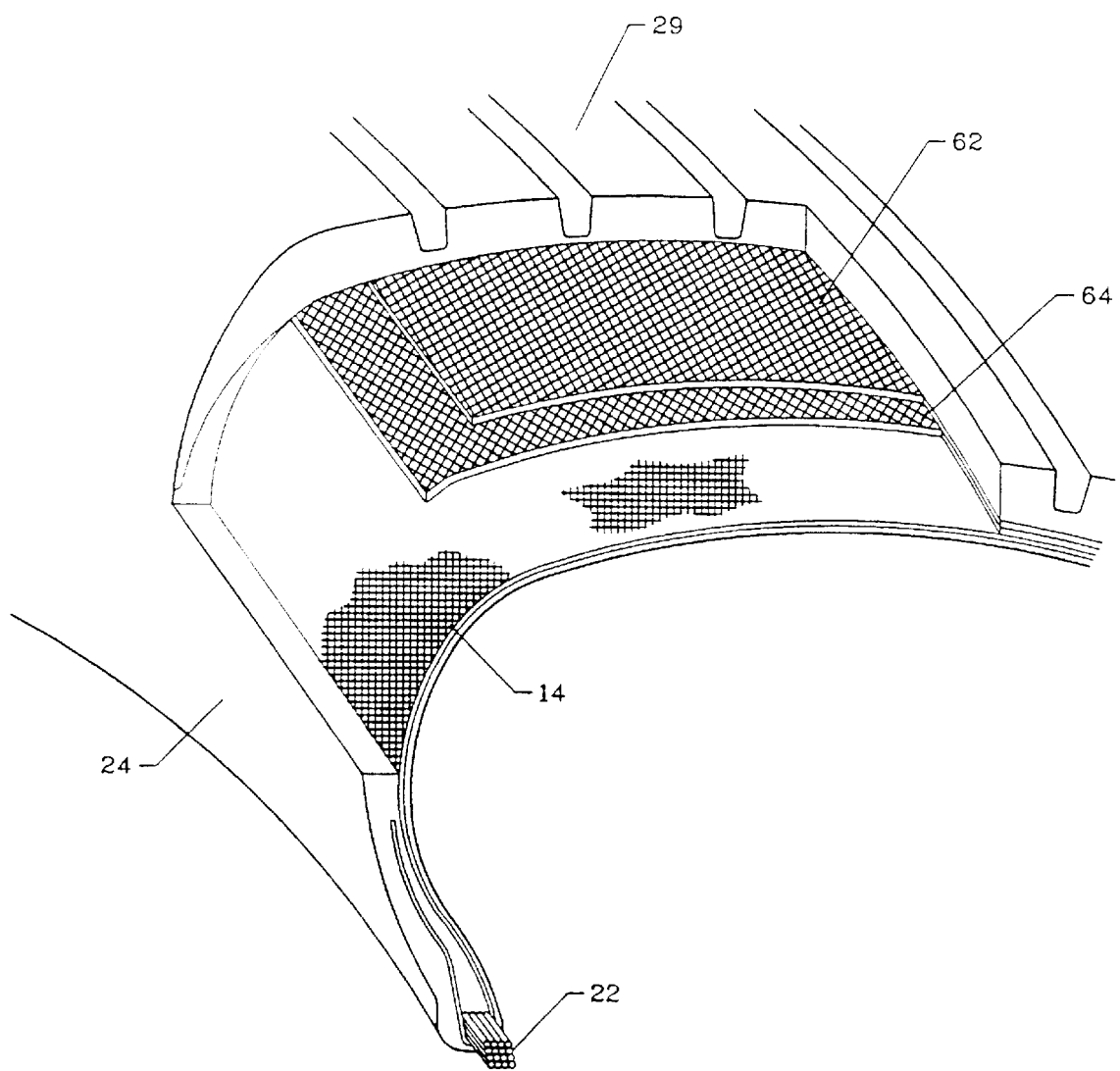
FIG. 6b illustrates a tire of the invention made using interlocked sock netting material as the ply reinforcement material and the belt material.

Finally, cut away views of alternative embodiments of completed tires are illustrated in FIGS. 6, 6a and 6b. FIG. 6 illustrates a tire made using netting carcass reinforcement without additional belt reinforcement. In FIG. 6a, a tire is illustrated having netting reinforcement 14 and conventional belts 62a, 64a. FIG. 6b illustrates an embodiment comprising a reinforcement netting 14 in place of a carcass ply and reinforcement netting 62, 64 in place of conventional belts. Netting reinforcement 14 is wrapped around beads 22, and tread 29 is disposed radially above netting belt reinforcement 62 in a crown area of the tire, and sidewalls 24 are disposed between the tread and the beads.

While the invention has been specifically illustrated and described, those skilled in this art will recognize that the invention can be variously modified and practiced within the limits of the claims. The limits of the invention are defined only by the following claims.

What is claimed is:

1. A pneumatic tire comprising at least a pair of parallel annular beads (22), a carcass reinforcement wrapped around said beads, an unreinforced gum rubber inner liner (12) disposed radially inwardly of said carcass reinforcement, tread rubber (29) disposed radially outward of said carcass reinforcement in a crown area of the tire, and sidewalls (24) disposed between said tread (29) and said beads (22), wherein said carcass reinforcement comprises a first sock (14, 52) of seamless mesh netting material formed from nominal warp filaments (16) and nominal weft filaments (18) of thermoplastic material which are fused at their intersections (19) and the first sock (14, 52) has both an interlocked filament portion (54) and a linear filament portion, the interlocked filament portion (54) being located near each respective bead and in the crown area of the tire, the linear filament portion being located in each respective sidewall of the tire.

2. The tire of claim 1 characterized in that a belt reinforcement (62,64) is disposed between said carcass reinforcement and said tread (29), the belt reinforcement (62, 64) being at least one belt width sock formed from nominal warp and nominal weft molten filaments of thermoplastic material being fused together at their intersections (19).

3. A The tire of claim 1 wherein said thermoplastic is selected from the group consisting of polyamide, aromatic polyamide, polyester, polyolefin, and mixtures thereof.

4. A method for building a pneumatic tire comprising the steps of (a) laying up gum rubber tire components (12) on a tire building drum (10) up to a point before a carcass ply is to be laid down on the building drum, (b) extruding a first sock (14, 52) of seamless mesh netting material formed from nominal warp and nominal weft molten filaments of thermoplastic material being fused together at their intersections (19), and drawing the filaments and drawing the first sock, c) pulling the first sock (14, 52) of seamless mesh netting material over and in surrounding relationship to the building drum (10) and previously applied gum rubber tire components (12), d) controlling the respective molten filaments of thermoplastic material such that the first sock (14, 52) has an interlocked filament portion (54) and a linear filament portion, and locating the interlocked filament portion near each respective bead and in a crown portion of the tire, and locating the linear filament portion in each respective sidewall of the tire.

5. The method of claim 4 further comprising the steps (e) extruding at least one belt width sock formed from nominal warp and nominal weft molten filaments of thermoplastic material being fused together at their intersections (19), (f) pulling the respective belt width socks over the first sock (14, 52), and (g) locating the respective belt width socks in a position to form belts (62,64) in a shaped tire.

6. The method of claim 4 comprising the further steps of (e) selecting said seamless mesh netting material from the group consisting of polyamide, aromatic polyamide, polyester polyolefin, and mixtures thereof, and (f) drawing said first sock (14, 52) of seamless mesh netting material so that its diameter is less than the diameter of building drum (10).

* * * * *